United States Patent
Lim et al.

(10) Patent No.: US 11,120,053 B2
(45) Date of Patent: Sep. 14, 2021

(54) SYSTEM AND METHOD FOR MULTI-DIMENSIONAL ENTITY RESOLUTION OF MOVING OBJECTS

(71) Applicant: International Business Machines Corporation, Armonk, NY (US)

(72) Inventors: Shiau Hong Lim, Singapore (SG); Laura Wynter, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 16/168,004

(22) Filed: Oct. 23, 2018

(65) Prior Publication Data

US 2020/0125670 A1    Apr. 23, 2020

(51) Int. Cl.
| | |
|---|---|
| G06F 16/00 | (2019.01) |
| G06F 16/28 | (2019.01) |
| H04W 4/02 | (2018.01) |
| G06F 16/29 | (2019.01) |
| G06F 16/2457 | (2019.01) |

(52) U.S. Cl.
CPC ...... *G06F 16/285* (2019.01); *G06F 16/24578* (2019.01); *G06F 16/29* (2019.01); *H04W 4/025* (2013.01)

(58) Field of Classification Search
CPC .......... G06F 16/24578; G06F 16/285
See application file for complete search history.

(56) References Cited

U.S. PATENT DOCUMENTS

| | | | |
|---|---|---|---|
| 9,230,258 B2* | 1/2016 | Adair | H04W 4/029 |
| 9,922,290 B2* | 3/2018 | Thomas | G06F 16/951 |
| 10,025,846 B2 | 7/2018 | Deshpande et al. | |
| 2011/0246494 A1 | 10/2011 | Adair et al. | |
| 2016/0048770 A1* | 2/2016 | Thomas | G06Q 30/01 |
| | | | 706/12 |
| 2017/0075984 A1 | 3/2017 | Deshpande et al. | |
| 2018/0137150 A1* | 5/2018 | Osesina | G06N 20/00 |
| 2018/0189658 A1 | 7/2018 | Sanchez et al. | |
| 2019/0303371 A1* | 10/2019 | Rowe | G06F 16/24564 |

* cited by examiner

*Primary Examiner* — Cheryl Lewis
(74) *Attorney, Agent, or Firm* — Harrington & Smith (57) ABSTRACT

A computer system includes one or more processors; and one or more non-transitory memories including computer program code, the one or more memories and the computer program code being configured to, with the one or more processors, cause the computer system to perform operations comprising: providing a first set of data records and a second set of data records in which each data record potentially relates to information associated with at least one transitional object; identifying a set of labelings in which at least one label refers to at least one data record; assigning a likelihood score that an identified label corresponds to a data record that is referred to; determining an identity of the at least one transitional object based on the assigned likelihood score; and outputting the determined identity.

14 Claims, 6 Drawing Sheets

SYSTEM AND METHOD FOR MULTI-DIMENSIONAL ENTITY RESOLUTION OF MOVING OBJECTS

BACKGROUND

The exemplary embodiments described herein relate generally to entity resolution and, more specifically, to the identification of objects based on ambiguous data.

Entity resolution is the task of finding records in a dataset that refer to the same entity using different labels. In a database in which multiple labels each refer to one entity, computational difficulties may arise with regard to manipulating sets of data such that all variants of a particular entity are suitably linked. For example, in a database of names of people, the same person may be referred to in different ways ("Robert Smith," "Bob Smith," Robert Z. Smith," etc. may all refer to the same person). Entity resolution is generally a useful technique for various forms of data processing to reconcile such instances in which multiple labels refer to the same entity. However, computations using such techniques may be numerically-intensive.

Such techniques may also be applied in scenarios in which the entities are moving objects such as people or vehicles such as trucks, airplanes, trains, or ships. Particularly with regard to vehicles involving the transportation of people or goods, the problem dimension (and hence the computational complexity) is generally increased with movement, as data is updated each time a new spatial location of an entity is recorded. In particular, for moving objects, the number of possible solutions of the resolved entity is increased exponentially over time, and current approaches may not be scalable to real-world scenarios due to the sizes of the factors involved.

BRIEF SUMMARY

In accordance with one aspect, a computer system comprises one or more processors; and one or more non-transitory memories including computer program code, the one or more memories and the computer program code being configured to, with the one or more processors, cause the computer system to perform operations comprising: providing a first set of data records and a second set of data records in which each data record potentially relates to information associated with at least one transitional object; identifying a set of labelings in which at least one label refers to at least one data record; assigning a likelihood score that an identified label corresponds to a data record that is referred to; determining an identity of the at least one transitional object based on the assigned likelihood score; and outputting the determined identity.

In accordance with another aspect, a computer program product comprises a computer readable storage medium having program instructions embodied therewith, the program instructions executable by a computer system to cause the computer system to perform operations comprising: providing a first set of data records and a second set of data records in which each data record potentially relates to information associated with at least one transitional object; identifying a set of labelings in which at least one label refers to at least one data record; assigning a likelihood score that an identified label corresponds to a data record that is referred to; determining an identity of the at least one transitional object based on the assigned likelihood score; and outputting the determined identity.

In accordance with another aspect, a method comprises providing two sets of data points, each of the two sets of data points comprising two or more data points in which each data point potentially relates to information associated with an object; identifying a set of labelings in which at least one label refers to at least one data point; determining a first score based upon a first probability that all of one of the sets of data points refers to a single object; determining a second score based upon a second probability that each of the two sets of data points both refer to the same object; combining the first score and the second score; and determining an identity of the object based on the combination of the first score and the second score.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
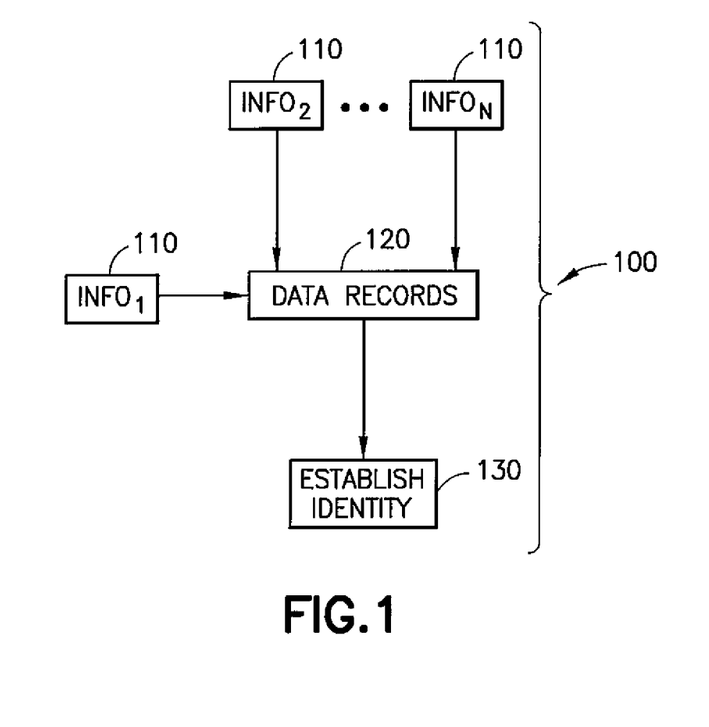
FIG. 1 is a schematic representation of a system using entity resolution to establish an identity of an object associated with a given piece of information.

Referring to FIG. 1, one exemplary embodiment of a system in which both spatial and temporal movement of data is leveraged in a scalable manner is shown generally at 100 and is hereinafter referred to as "system 100." In the system 100, entity resolution may be used to establish an identity of a transitional object associated with any given piece of information 110 (data points) that may be used to form at least a portion of a data record 120. As used herein, a "transitional" object is an object that moves in time and space. In some exemplary embodiments, the transitional object (or simply "object") may be a vehicle such as a truck, airplane, train, ship, or other vessel involved with the transportation of any type of cargo including, for example, people and/or goods. In other embodiments, the object may be the person itself.

When the object is a vehicle, sources of information 110 may include position markers, speed readings, directional readings, vehicle identity information, and the like. At least some of such information 110 (position markers, speed, and directional readings, for example) may be received from broadcasts from global positioning satellite (GPS) systems.

When the object is a person, and when/if the person is moving in space and time, sources of information 110 associated with the person may include information from GPS systems (as with a vehicle), and/or they may include transactional events (financial events such as credit card or ATM transactions), a social media event (such as a social media website "check-in" or tagging of photos or social media postings), GSM signals (global system for mobile communication signals), and the like.

When the object is, for example, a ship in a maritime setting, the various sources of information 110 may include AIS (automatic identification system) broadcasts and radar tracks. Such information 110 may be processed and fused into a sequence of vessel traffic records that form, at least in part, the data record 120. Vessel identity information, such as an IMO number and/or an MMSI number, may also be included in the information 110. The IMO number is the International Maritime Organization number, which is a seven digit number assigned to merchant ships of more than 100 gross tonnes at the time of building, and the MMSI number is the Maritime Mobile Service Identity, which is a nine digit calling number for each vessel, which may change when the ship is sold or otherwise transferred. In addition, there are region-specific vessel identification numbers as well as radar tracking identification numbers associated with each ship. The entity resolution of the data record 120, based on the information 110, may be used to establish identity 130.

Figure 2:
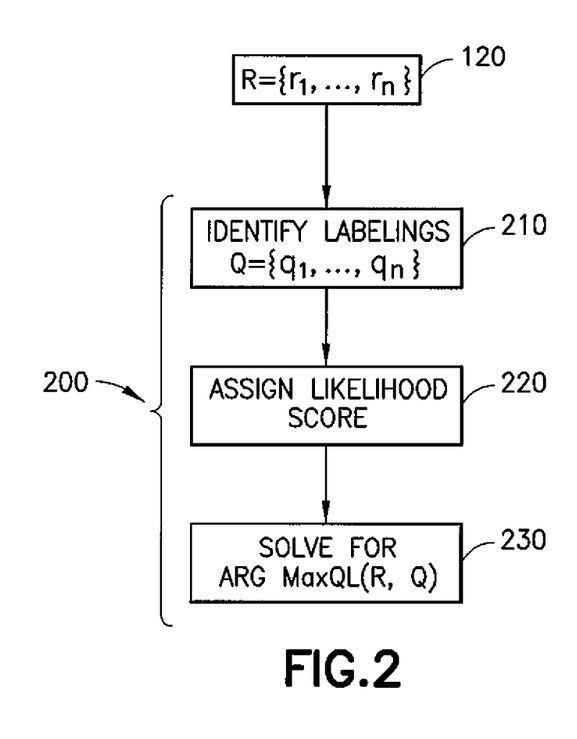
FIG. 2 is a flow of a method of carrying out entity resolution.

Referring to FIG. 2, one exemplary embodiment of carrying out the entity resolution is shown at 200. In the steps of carrying out the entity resolution 200, the given set of data records 120 may be characterized as $R=\{r_1, \ldots, r_n\}$. Using the given set of data records 120, a corresponding set of labelings is identified as indicated at block 210. The labelings may be $Q=\{q_1, \ldots, q_n\}$ such that $q_i=q_j$ if and only if $r_i$ and $r_1$ both refer to the same physical object. One exemplary approach to the entity resolution 200 then is to build a model that assigns a likelihood score L(R, Q) for any labeling Q of R, as indicated at block 220. Then, arg maxQ L(R, Q) is solved for in a solving step, as indicated at block 230, to determine an identity of the object. In general, this may be a difficult combinatorial problem, and the challenge is to find an approximate solution that is computationally tractable in real time.

Figure 3:
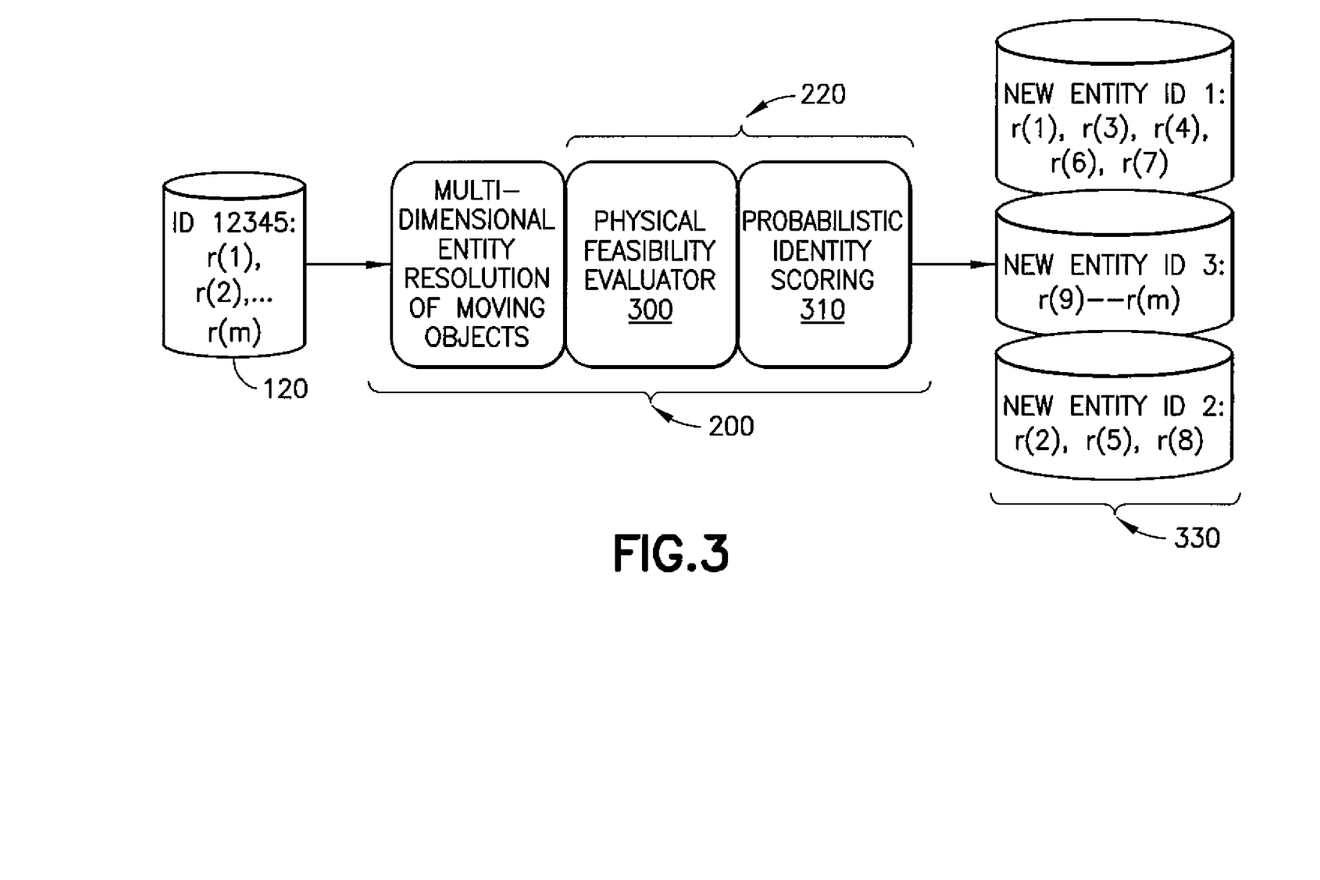
FIG. 3 is a schematic representation of entity resolution utilizing a model of physical feasibility and a model of probabilistic identity scoring.

Referring to FIG. 3, one exemplary embodiment of the entity resolution 200 of the moving objects in multiple dimensions utilizes two models, namely, a model of physical feasibility 300 and a model of probabilistic identity scoring 310. In the model of physical feasibility 300, given the set of data records 120 (R), a first score is assigned based upon how likely the entire set of data records 120 (R) comes from a single unique vessel. This model then strikes a balance between robustness to noisy data and sensitivity to violation of physical laws. Noisy data may be the result of outlying data points that are questionable as to whether they pertain to a particular moving object. This model may also derive the first score as having some amount of error due to an object that changes identity, or due to a missing identity, or due to the sharing of identities by multiple objects.

In the model of probabilistic identity scoring 310, given two sets of data records 120 (R1 and R2), each containing some identification information, the model of probabilistic identity scoring 310 assigns a second score based on how likely it is that R1 and R2 both refer to the same object.

The model of physical feasibility 300 and the model of probabilistic identity scoring 310 are combined using a multiple hypotheses tracking (MHT) approach to incorporate the likelihood scores for both models. The basic idea of MHT is to build a "tree" where each path constitutes a hypothesis, for example, an assignment of an identity label to a sequence of observed records. The challenge is to find the set of hypotheses that are mutually compatible and jointly achieve the maximum likelihood.

Addressing such a challenge generally involves solving a maximum weighted independent set problem, which is NP-hard (difficult with regard to nondeterministic polynomial time). The key to efficient real-time solution is to employ likelihood functions that allow quick pruning of the tree such that the size of the hypothesis tree remains small. One way to do so is to solve as a maximum-weight clique problem, which involves graphing the data points 120 such that connected data points 120 form vertices, then finding the data point 120 (vertex) having a maximum weight relative to the other data points (vertices). Compared to approaches such as network flow-based methods, MHT can capture relationships beyond pair-wise costs. This capability is particularly useful, for example, to allow for a change of identity (such as a change of MMSI when the object is a maritime vessel) but to penalize oscillations between identities. The output, as shown at 330, is a set of unique identities.

In one exemplary embodiment of the output 330, for example, if r(1), r(2), r(3), r(m) belong to three different entities, then the subset of records belonging to the first entity will be given a unique identifier, and similarly for the subset of records for the second and third entities. Based on this, the entity resolution 200 can be carried out in quasi-real time.

Figure 4:
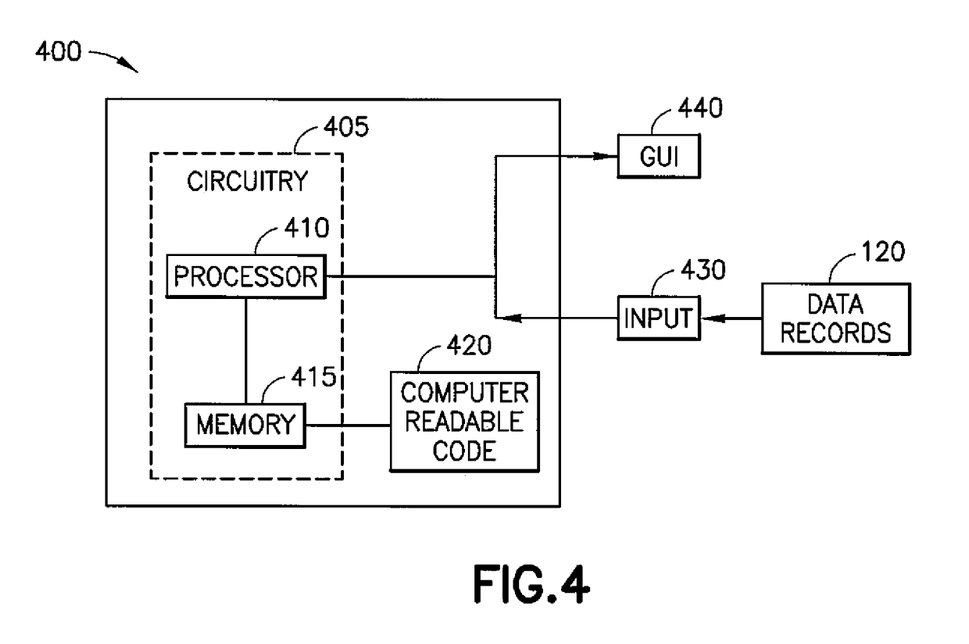
FIG. 4 is a block diagram of one possible internal configuration of elements of a system for entity resolution.

Referring to FIG. 4, the entity resolution 200 may be carried out using a computer system 400 having circuitry 405 with one or more processors 410 and associated memories 415. The memories 415 may include computer readable code 420, which, when accessed and executed by the one or more processors 410, causes the computer system 400 to perform the operations described herein, such as those described in the Figures. Computations may be implemented in whole or part in the circuitry 405, which itself may implement the one or more memories 415 and the one or more processors 410. For instance, the processor 410 may implement programming steps needed to carry out the computations in an integrated circuit or as part of a programmable logic device. User input to the computer system 400 may be received through a user input device 430, which may receive the data records 120, and the entity resolution 200 as output may be provided to a user via a display such as a graphical user interface (GUI) 440.

Figure 5:
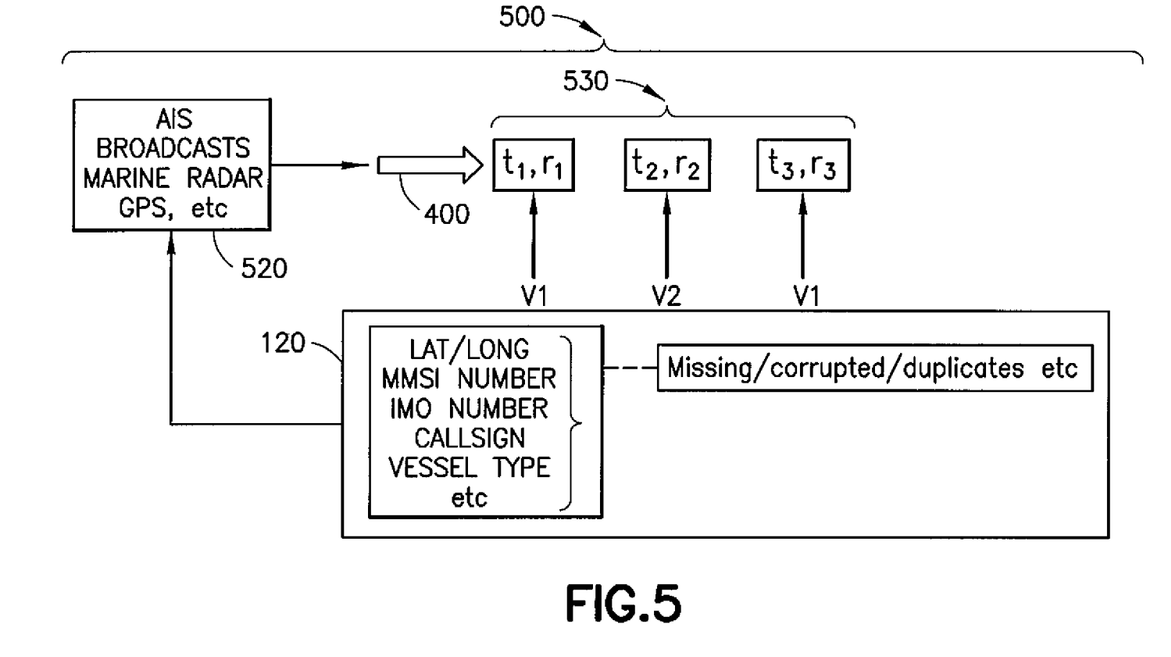
FIG. 5 is a schematic representation of establishing an identity associated with data records in a marine example.

Referring now to FIG. 5, one exemplary embodiment of establishing an identity of an object associated with each data record 120, in a marine example in which the objects are vessels such as ships, is shown generally at 500. As shown, data records 120 are obtained and are used to form AIS broadcasts, readings from marine radar, GPS signals, combinations of the foregoing, and the like, as indicated at 520. The data from 520 is transferred to the computer system 400 where it is operated on and assigned scores based on operations of the one or more processors 410. Using the model of physical feasibility 300, a first score is assigned based upon how likely latitude and longitude readings, MMSI numbers, IMO numbers, call signs, vessel types, etc.

all refer to a single unique vessel. Using the model of probabilistic identity scoring 310, a determination is then made with regard to how likely it is that the same vessel is referred to based on a second score. Missing, corrupted, and duplicative data may be taken into account. MHT can account for data with missing records by introducing "null" nodes within a hypothesis/branch. The two models (the model of physical feasibility 300 and the model of probabilistic identity scoring 310) can score each occasion of missing/corrupted/duplicative data accordingly. The result, as shown at 530, is that for three sets of data records 520, only two different vessels (V1 and V2) are discerned.

Figure 6:
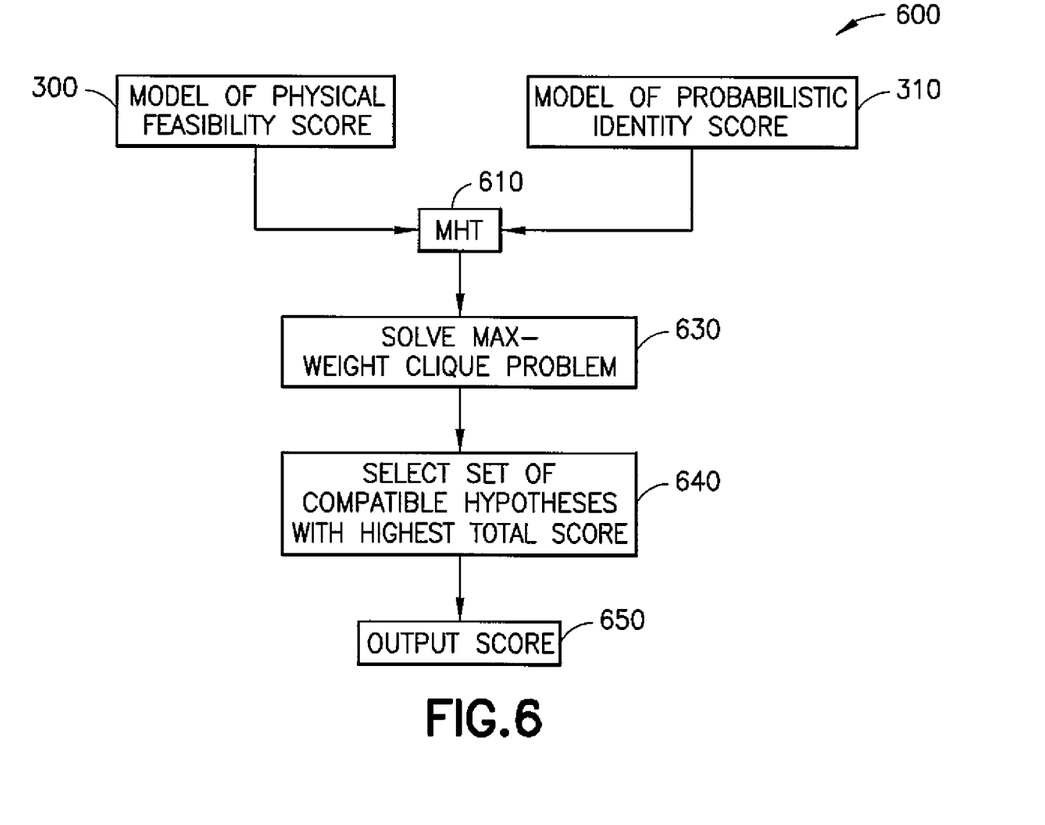
FIG. 6 is a flow of a method of establishing identity using multiple hypotheses tracking.

Referring now to FIG. 6, one exemplary embodiment of a method of establishing identity is shown at 600. Method 600 employs the model of physical feasibility 300 and the model of probabilistic identity scoring 310, which are combined using MHT as shown in block 610 and used to build the tree where each path (based on the scores) constitutes a hypothesis. In order to "prune" the tree to remove incompatible hypotheses, the maximum-weight clique problem is solved in which the scores are graphed and subsets of adjacent vertices are solved for the maximum weight using any suitable algorithm, as shown in block 630. Many algorithms for solving the maximum-weight clique problem, both exact and approximate, are available for use in method 600. Then, a set of compatible hypotheses is selected, as shown in block 640, based on the results of the maximum-weight clique problem from block 630. An output score is then generated and output in block 650. Such an approach may be used for visual tracking in computer vision (reading of digital images or video by a computer), where a score is a summation of a motion score and an appearance score. When such approach is used for entity resolution, a score is a summation of a motion score and an identity score. In either case, motion scores may be based on Kalman filtering, which is a linear track-smoothing method that involves forming a weighted average of a prediction and a measurement of state, taking into account known measurement errors.

Figure 7A:
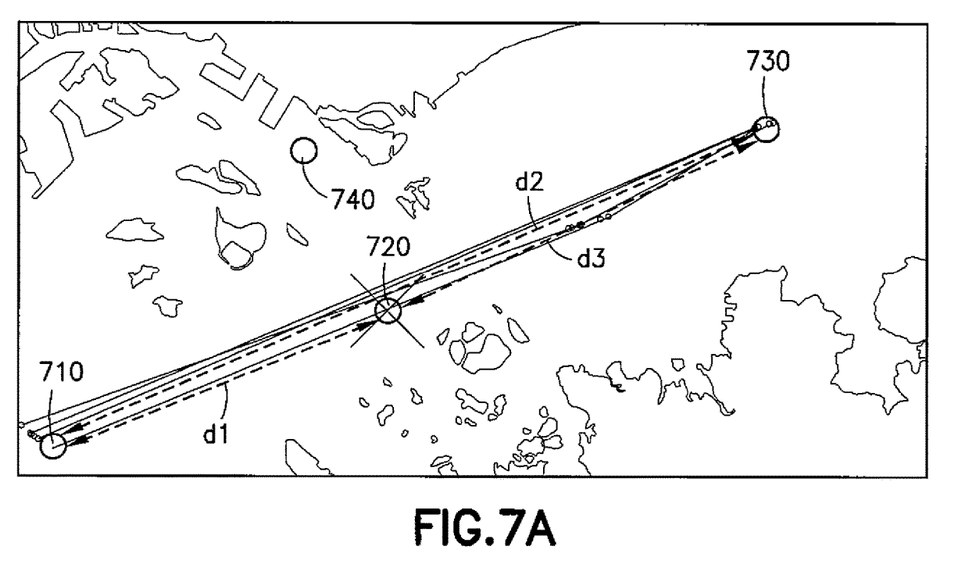
FIGS. 7A and 7B are graphical representations of vessels to be identified by a method of establishing identity using multiple hypotheses tracking.
Figure 7B:
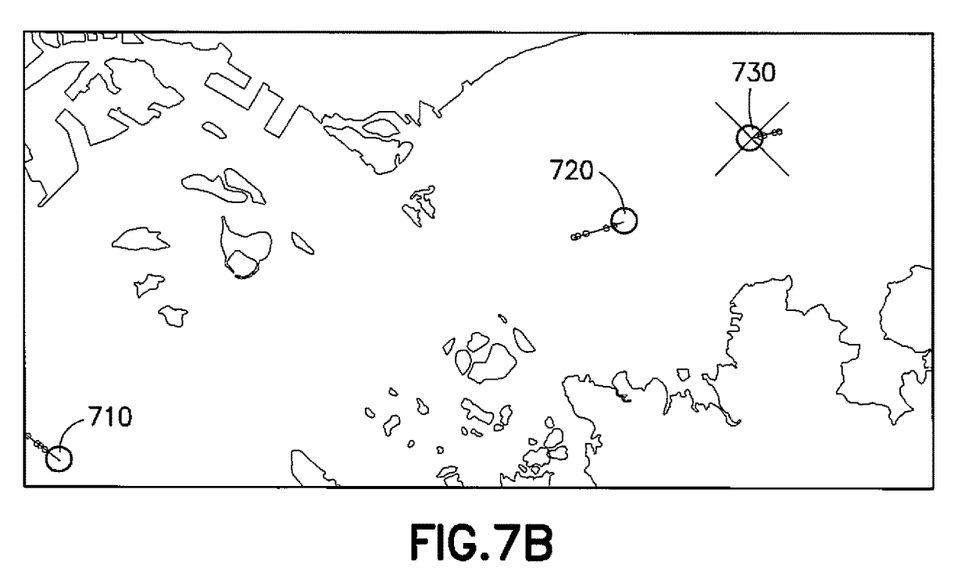

Referring now to FIGS. 7A and 7B, one exemplary embodiment shows a first vessel 710, a second vessel 720, and a third vessel 730, each of which, may have similar identities, operating sufficiently close to each other as indicated by distances d1, d2, and d3. Some outlier records 740 may suggest the possibility of a fourth vessel. A system without proper entity resolution would mistakenly associate all the records with one single vessel, and one or more of the following can happen: (i) the system may summarize the records into a wrong trajectory; (ii) the system may discard a significant number of records as noise and render one or more vessels "invisible"; (iii) the system may be alarmed by the fact that this vessel is making some physically infeasible or dangerous movements. The proposed method such as the method 600, in this case, can correctly identify the individual records that belong to each of the first vessel 710, the second vessel 720, and the third vessel 730. The outlier records 740 (due to tracking noise) that suggest the possibility of the fourth vessel are correctly ignored since they are not significant enough for MHT to instantiate an additional vessel.

In one example, a computer system comprises one or more processors; and one or more non-transitory memories including computer program code, the one or more memories and the computer program code being configured to, with the one or more processors, cause the computer system to perform operations comprising: providing a first set of data records and a second set of data records in which each data record potentially relates to information associated with at least one transitional object; identifying a set of labelings in which at least one label refers to at least one data record; assigning a likelihood score that an identified label corresponds to a data record that is referred to; determining an identity of the at least one transitional object based on the assigned likelihood score; and outputting the determined identity.

Assigning a likelihood score that an identified label corresponds to a data record may comprise determining a first score based upon a first probability that all of one of the first set of data records refers to a single transitional object, determining a second score based upon a second probability that the first set of data records and the second set of data records both refer to the same transitional object, and combining the first score and the second score. Combining the first score and the second score may comprise making a hypothesis, based on the first score and the second score, that the identified label and the data record refer to the same transitional object. Determining an identity of the at least one transitional object based on the assigned likelihood score may comprise solving a maximum-weight clique problem. The at least one transitional object may comprise a truck, airplane, train, or ship. The information associated with the at least one transitional object may comprise one or more of a position marker, a speed, a directional reading, and a vehicle identity. The at least one transitional object may comprise a maritime vessel. The information associated with the maritime vessel may comprise one or more of a position marker, a speed, a directional reading, and a vessel identification number. The at least one transitional object may comprise a person and the information associated with the person may comprise one or more of a transactional event, a social media event, and a signal related to a system for mobile communication.

In another example, a computer program product comprises a computer readable storage medium having program instructions embodied therewith, the program instructions executable by a computer system to cause the computer system to perform operations comprising: providing a first set of data records and a second set of data records in which each data record potentially relates to information associated with at least one transitional object; identifying a set of labelings in which at least one label refers to at least one data record; assigning a likelihood score that an identified label corresponds to a data record that is referred to; determining an identity of the at least one transitional object based on the assigned likelihood score; and outputting the determined identity.

Assigning a likelihood score that an identified label corresponds to a data record may comprise determining a first score based upon a first probability that all of one of the first set of data records refers to a single transitional object, determining a second score based upon a second probability that the first set of data records and the second set of data records both refer to the same transitional object, and combining the first score and the second score. Combining the first score and the second score may comprise making a hypothesis, based on the first score and the second score, that the identified label and the data record refer to the same transitional object. Determining an identity of the at least one transitional object based on the assigned likelihood score may comprise solving a maximum-weight clique problem.

In another example, a method comprises providing two sets of data points, each of the two sets of data points comprising two or more data points in which each data point potentially relates to information associated with an object; identifying a set of labelings in which at least one label refers to at least one data point; determining a first score based upon a first probability that all of one of the sets of data points refers to a single object; determining a second score based upon a second probability that each of the two sets of data points both refer to the same object; combining the first score and the second score; and determining an identity of the object based on the combination of the first score and the second score.

Combining the first score and the second score may comprise making a hypothesis, based on the first score and the second score, that the identified label and the at least one data point refer to the same object. Determining an identity of the object based on the combination of the first score and the second score may comprise solving a maximum-weight clique problem.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that when an element as a layer, region, or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:

1. A computer system, comprising:
   one or more processors; and
   one or more non-transitory memories including computer program code, the one or more memories and the computer program code being configured to, with the one or more processors, cause the computer system to perform operations comprising:
   providing a first set of data records and a second set of data records in which each data record potentially relates to information associated with at least one transitional object;
   identifying a set of labelings in which at least one label refers to at least one data record;
   assigning a likelihood score that an identified label corresponds to a data record that is referred to;
   determining an identity of the at least one transitional object based on the assigned likelihood score; and
   outputting the determined identity;
   wherein assigning a likelihood score that an identified label corresponds to a data record comprises,
      determining a first score based upon a first probability that the first set of data records refers to a single transitional object,
      determining a second score based upon a second probability that the first set of data records and the second set of data records both refer to the same transitional object.,
      combining the first score and the second score.,
      determining a third score based upon a third probability that the first set of data records refers to the same transitional object.,
      determining a fourth score based upon a fourth probability that the first set of data records and the second set of data records both refer to the same transitional object.,
      combining the third score and the fourth score, and
      determining if the combined first and second scores are compatible with the combined third and fourth scores.

2. The computer system of claim 1, wherein combining the first score and the second score comprises making a hypothesis, based on the first score and the second score, that the identified label and the data record refer to the same transitional object.

3. The computer system of claim 1, wherein determining an identity of the at least one transitional object based on the assigned likelihood score comprises solving a maximum-weight clique problem.

4. The computer system of claim 1, wherein the at least one transitional object comprises a truck, airplane, train, or ship.

5. The computer system of claim 4, wherein the information associated with the at least one transitional object comprises one or more of a position marker, a speed, a directional reading, and a vehicle identity.

6. The computer system of claim 1, wherein the at least one transitional object comprises a maritime vessel.

7. The computer system of claim 6, wherein the information associated with the maritime vessel comprises one or more of a position marker, a speed, a directional reading, and a vessel identification number.

8. The computer system of claim 1, wherein the at least one transitional object comprises a person and the information associated with the person comprises one or more of a transactional event, a social media event, and a non-transitory signal related to a system for mobile communication.

9. A computer program product comprising a computer readable storage medium having program instructions embodied therewith, the program instructions executable by a computer system to cause the computer system to perform operations comprising:
   providing a first set of data records and a second set of data records in which each data record potentially relates to information associated with at least one transitional object;
   identifying a set of labelings in which at least one label refers to at least one data record;
   assigning a likelihood score that an identified label corresponds to a data record that is referred to;
   determining an identity of the at least one transitional object based on the assigned likelihood score; and outputting the determined identity to a graphical user interface;
    wherein assigning a likelihood score that an identified label corresponds to a data record comprises,
        determining a first score based upon a first probability that the first set of data records refers to a single transitional object,
        determining a second score based upon a second probability that the first set of data records and the second set of data records both refer to the same transitional object,
        combining the first score and the second score,
        determining a third score based upon a third probability that the first set of data records refers to the same transitional object,
        determining a fourth score based upon a fourth probability that the first set of data records and the second set of data records both refer to the same transitional object,
        combining the third score and the fourth score, and
        determining if the combined first and second scores are compatible with the combined third and fourth scores.

10. The computer program product of claim 9, wherein combining the first score and the second score comprises making a hypothesis, based on the first score and the second score, that the identified label and the data record refer to the same transitional object.

11. The computer program product of claim 9, wherein determining an identity of the at least one transitional object based on the assigned likelihood score comprises solving a maximum-weight clique problem.

12. A method, comprising:
    providing one or more processors and one or more non-transitory memories including computer program code;
    providing two sets of data points to the one or more processors, each of the two sets of data points comprising two or more data points in which each data point potentially relates to information associated with a transitional object;
    identifying a set of labelings in which at least one label refers to at least one data point;
    determining a first score based upon a first probability that all of one of the sets of data points refers to the transitional object;
    determining a second score based upon a second probability that all of the other set of data points refers to the same transitional object;
    combining the first score and the second score;
    determining a third score based upon a third probability that all of one of the sets of data points refers to the same transitional object,
    determining a fourth score based upon a fourth probability that all of the other set of data points refer to the same transitional object,
    combining the third score and the fourth score, and
    determining if the combined first and second scores are compatible with the combined third and fourth scores;
    determining an identity of the object based on the combination of the first score and the second score; and
    outputting the identity of the object to a graphical user interface.

13. The method of claim 12, wherein combining the first score and the second score comprises making a hypothesis, based on the first score and the second score, that the identified label and the at least one data point refer to the same object.

14. The method of claim 13, wherein determining an identity of the object based on the combination of the first score and the second score comprises solving a maximum-weight clique problem.

* * * * *